United States Patent

[11] 3,548,983

| [72] | Inventor | Kazuyoshi Hiraiwa<br>Tokyo, Japan |
|---|---|---|
| [21] | Appl. No. | 822,165 |
| [22] | Filed | May 6, 1969 |
| [45] | Patented | Dec. 22, 1970 |
| [73] | Assignee | Missan Motor Company, Limited<br>Kanagawa-ku, Yokohama, Japan |
| [32] | Priority | May 15, 1968 |
| [33] | | Japan |
| [31] | | No. 43/32751 |

[54] SYNCHRONIZING MECHANISM IN THE TRANSMISSION OF CONSTANT-MESH TYPE IN AN AUTOMOTIVE VEHICLE
5 Claims, 60 Drawing Figs.

[52] U.S. Cl. .................................. 192/53, 74/339
[51] Int. Cl. .................................. F16d 23/06, F16h 3/38
[50] Field of Search .......................... 74/339; 192/53

[56] References Cited
UNITED STATES PATENTS

| 2,107,112 | 2/1938 | Fawick ..................... | 74/339X |
| 2,410,511 | 11/1946 | Letsinger et al............ | 192/53 |
| 2,515,010 | 7/1950 | Kishline..................... | 192/53 |
| 2,788,874 | 4/1957 | Forster....................... | 192/53 |
| 2,896,260 | 7/1959 | Hebbinghans................ | 192/53 |

*Primary Examiner*—Arthur T. McKeon
*Attorneys*—Robert E. Burns and Emmanuel J. Lobato ABSTRACT: A synchronizing mechanism in the transmission of constant-mesh type in an automotive vehicle having a rotary shaft formed with splines thereon, gearwheels formed with an annular axial extension having external splines, a sleeve, sleeve retainer and synchronizer rings in which the sleeve retainer, synchronizer rings and sleeve are disposed in such a manner that an additional axial force is exercised so as to synchronize the gearwheels by the contact between one of the tapered flanks of each of the noses formed on the sleeve and one of the tapered flanks of each of the noses formed on the sleeve for synchronizing action.

Fig. 16A
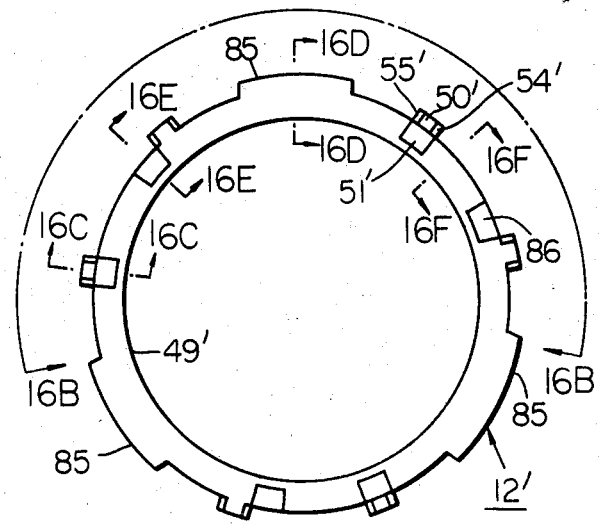
Fig. 16B
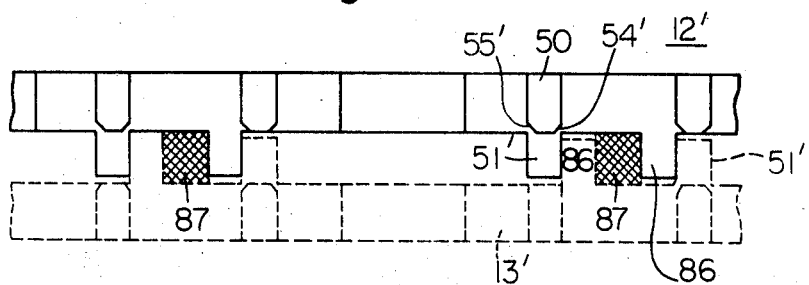
Fig. 16C  Fig. 16D  Fig. 16E  Fig. 16F
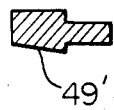 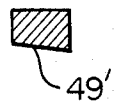 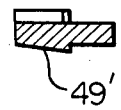 

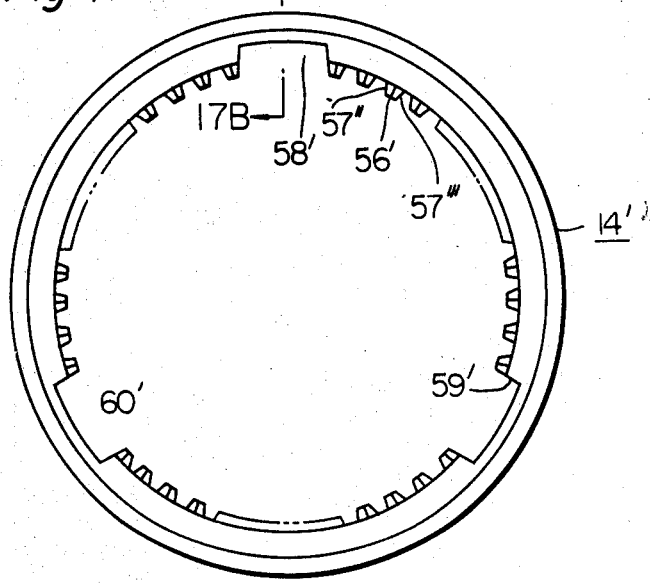
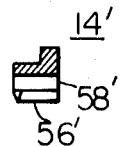
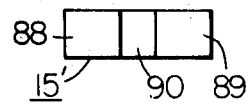
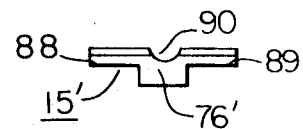
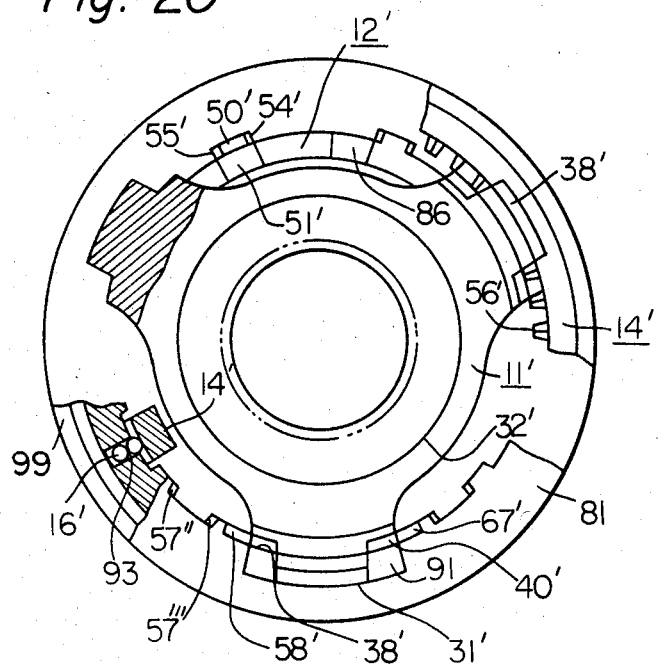
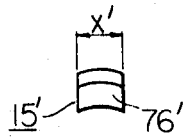

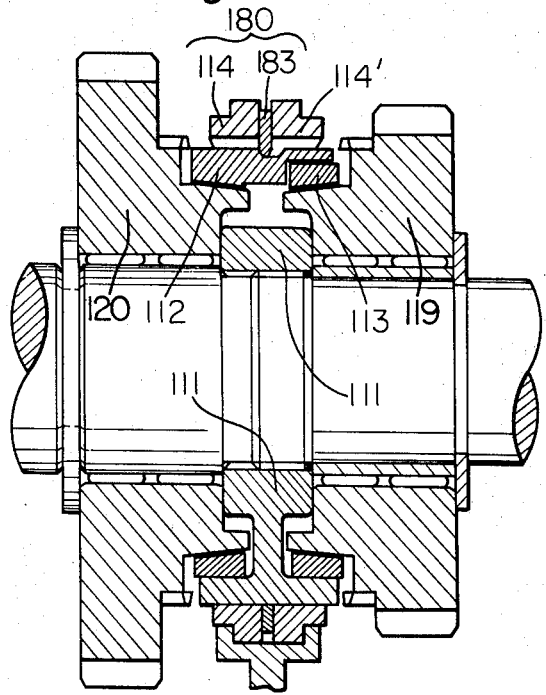
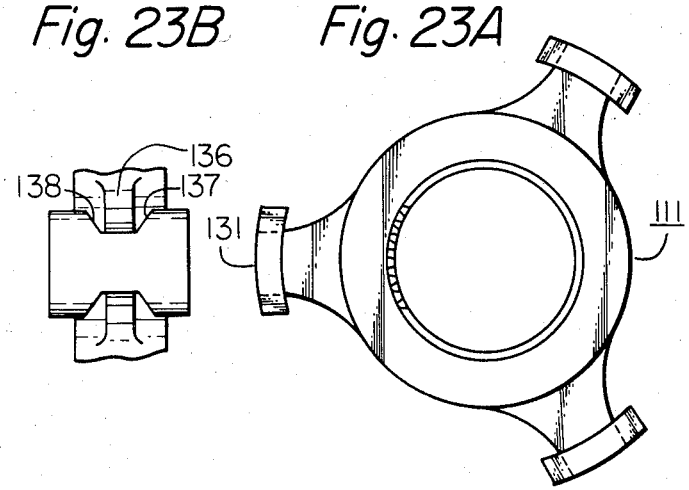

ardized# SYNCHRONIZING MECHANISM IN THE TRANSMISSION OF CONSTANT-MESH TYPE IN AN AUTOMOTIVE VEHICLE This invention relates to a synchronizing mechanism in the transmission of constant-mesh type of automobile, and more particularly to improvements in the synchronizer mechanism in which an additional force for synchronizing action is exercised by the contact of a tapered surface formed on both the sleeve retainer and sleeve.

In the transmission of constant-mesh type, if there is a large difference in a speed between two gearwheels to be engaged in mesh with each other, it is difficult to engage smoothly the gearwheels due to large difference of the peripheral speeds of the gearwheels when they are engaging.

A synchronizer mechanism comes into operation when a shift is made to different speed gears. This mechanism synchronizes gears that are approaching mesh so that the teeth which are about to mesh are moving at the same speed.

The conventional synchronizer mechanism uses a simple cone clutch. The synchronizer clutch sleeve has a cone braking surface at its end. A synchronizer ring fits loosely into this section of the sleeve, held in position by a sleeve retainer. The outer surface of the ring matches the inner cone face of the clutch sleeve, and the braking effect, which produces synchronization, takes place between these two surfaces. As the synchronizer ring is pushed to either direction by the sleeve, the outer face of the ring presses hard against the inner cone face of the clutch sleeve. As soon as pressure is exerted between the inner cone face of the sleeve and the outer face of the synchronizer ring, the friction between the two surfaces imposes a drag on the gear to be changed. This frictional drag brings the sleeve and the gear to be changed into synchronization, so that both are turning at the same speed.

This invention contemplates to provide a synchronizer mechanism in a transmission of a constant-mesh type in an automobile which increases the synchronizing capacity or which provides easy manipulation of speed shifting.

The features and advantages of the present invention will become apparent from the following description taken in conjunction with the accompanying drawings, in which:

FIGS. 16A, 16B and 16C, 16D, 16E and 16F are views of modified synchronizer ring;

FIGS. 17A and 17B are views of sleeves in an alternative construction;

FIGS. 18A, 18B and 18C are views of an alternative key constructed according to the present invention;

FIG. 20 is a view in partial section of an assembly of the sleeve retainer, synchronizer rings, sleeve, key, balls and thrustplate;

FIG. 22 is a view similar to the arrangement shown in FIGS. 1 and 14A but some of components are modified;

FIGS. 23A and 23B are views of another alternative sleeve retainer of the present invention;

Figure 1:
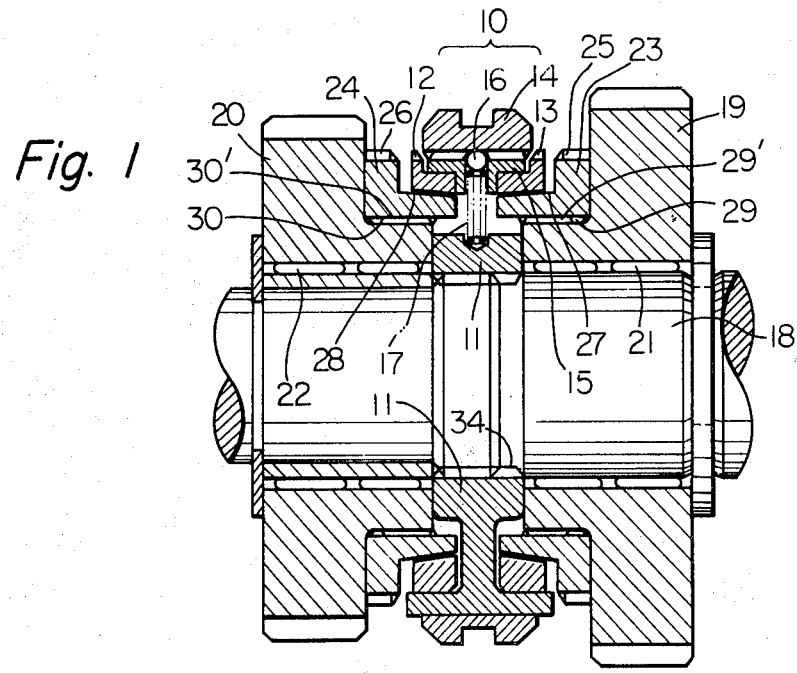
FIG. 1 is a sectional view of part of a conventional motor vehicle gearbox of the constant-mesh type incorporating a synchronizing mechanism according to the present invention.

Referring now to FIG. 1, which shows a sectional view of part of a conventional motor vehicle gearbox of constant-mesh type having a synchronizing mechanism according to the present invention, which mechanism 10 comprises largely a sleeve retainer 11, synchronizer rings 12 and 13, a sleeve 14, a key 15, balls 16 and spring 17 in assembly.

The synchronizing mechanism 10 is mounted on a rotary mainshaft 18 formed with axially extending splines, on which second and third gear ratio gearwheels 19 and 20 are rotatably mounted on respective bearings 21 and 22 adjacent to the splines of the mainshaft 18, forming the output shaft of the gearbox, and are constantly driven during operation of the gearbox at different speeds by means of respective sets of gear teeth (not shown) by an engine-driven input shaft (not shown). Adjacent inwardly to the second and third gear ratio gearwheels 19 and 20 are integrally mounted in splined engagement spline gearwheels 23 and 24, respectively, having respective axially extending external splines 25 and 26 on the circumferential peripheries thereof and annular axial extensions formed with tapered surfaces or clutch drums 27 and 28, respectively, thereon, and with axially extending internal splines 29 and 30 for meshing with the external splines 29' and 30' of the extensions of said gearwheels 19 and 20 and with axially extending external splines 27 and 28 for selectively connecting said gearwheel and the rotary shaft 18 also meshed with the second and third gear ratio gearwheels 19 and 20, respectively as shown at the portion designated by 29 and 30 in FIG. 1.

Figure 2A:
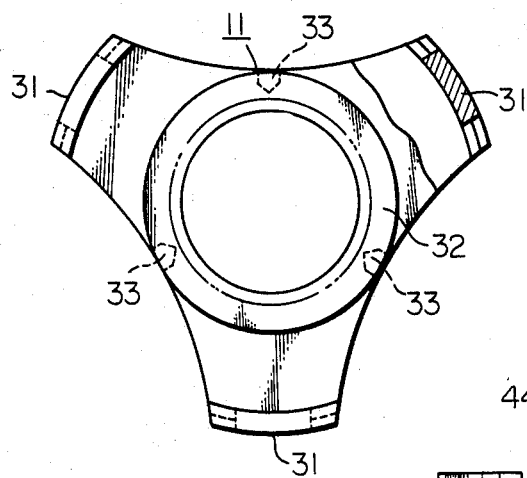
FIGS. 2A and 2B are views of a sleeve retainer constructed in accordance with the present invention.
Figure 2B:
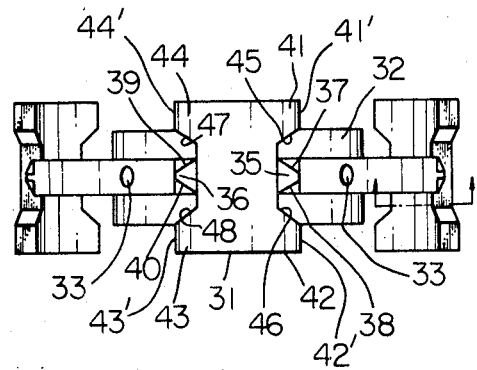

In FIGS. 2A and 2B, which show the sleeve retainer 11 constructed according to the present invention, which is provided with three projections 31 radially projecting from a splined boss 32 of the retainer for meshing with an external spline 34 (FIG. 1) formed on the mainshaft 18, and with three holes 33 each retaining the spring 17. Each projection 31 is formed with two noses 35 and 36 centrally on both sides in the circumferential direction of the retainer 11 and formed with axially extending flanks 41', 42', 43' and 44', and tapered flanks 37, 38, 39 and 40, respectively, and the projection 31 is further formed with four corner ears 41, 42, 43 and 44 each being formed with an internally tapered flanks provided in the circumferential direction designated by 45, 46, 47 and 48, respectively.

As shown in FIGS. 3A, 3B, 3C and 3D, which show the synchronizer ring 12 or 13 constructed according to the present invention, which ring 12 has a cone braking inner surface 49 formed with axially tapered surface for establishment of a slidable engagement with the tapered surface of the annular extension of said spline gearwheel similar to the surface 28 of the clutch drum, a plurality of axially extending external teeth 50 formed on the outer periphery thereof and having axially tapered flanks on both sides thereof, and three key ways 51, 52 and 53 provided equidistantly on the outer periphery thereof. The tooth form of the gear 50 is similar to that of the spline gearwheel 24 having axially tapered flanks 54 and 55.

Figure 3A:
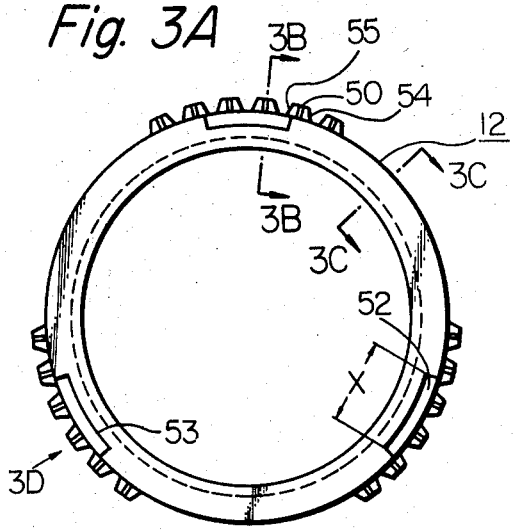
FIGS. 3A, 3B, 3C and 3D are views of a synchronizer ring formed according to the present invention.
Figure 3B:
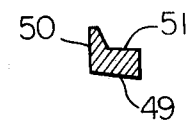
Figure 3C:
Figure 4A:
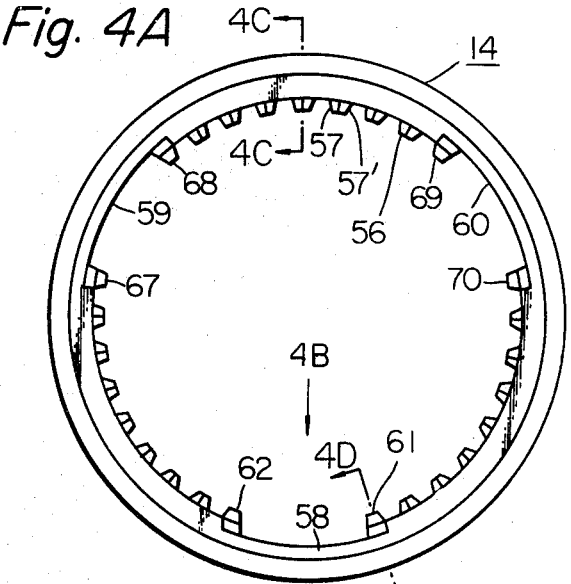
FIGS. 4A, 4B, 4C and 4D are views of a sleeve constructed according to the present invention.
Figure 3D:
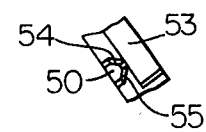

FIG. 3B shows a section taken along the line 3B—3B in FIG. 3A of the synchronizer ring 12 illustrating the cone braking surface 49, tooth 50 and key way 51. FIG. 3C shows a section taken along the line 3C—3C of the synchronizer ring 12 shown in FIG. 3A showing the cone braking surface 49 thereof. And, FIG. 3D shows a plan view of the outer periphery when viewed in the direction of the arrow 3D of the synchronizer ring 12 denoted in FIG. 3A illustrating the tooth 50 having tapered flanks 54 and 55.

Figure 4C:
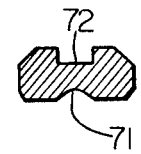
Figure 4B:
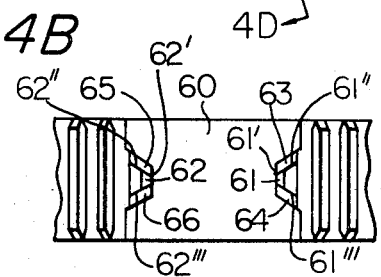
Figure 4D:
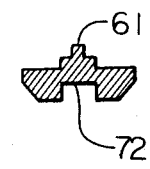

Referring now to FIGS. 4A, 4B, 4C and 4D, which show a sleeve 14 constructed in accordance with the present invention, the sleeve 14 comprises an axially extending internal spline 56 formed on the inner surface thereof for meshing with the external spline 50 of the synchronizer ring 12 or 13, which has axially tapered flanks 57 and 57' at both ends of the spline, and equidistantly formed three cutouts 58, 59 and 60 formed on the inner surface of the sleeve 14 for meshing with the projections 31 of the sleeve retainer 11. On both circumferential sides of the cutout such as designated by 58 are mounted noses 61 and 62 formed at both ends thereof and projecting inwardly from both ends and having axially tapered flanks 63, 64 and 65, 66 (FIG. 4B) formed stepwise with respect to the noses 61 and 62 to form the upper tapered flanks 61''', 61''' and 62'', 62''' of the noses 61 and 62 formed correspondingly to the tapered flanks 37, 38 and 39, 40 of the noses 35 and 36 of the sleeve retainer 11 in shape and the lower tapered flanks 63, 64 and 65, 66 of noses 61 and 62 of the sleeve 16 formed correspondingly to the tapered flanks 45, 46 and 47, 48 of the ears 41, 42, and 43, 44 of the sleeve retainer 11 with the result that axially extending flanks 61' and 62' are also so formed as to transmit the torque between the sleeve retainer 11 and the sleeve 14 in contact with the axially extending flanks 41', 42' and 43', 44', as shown in FIG. 2B. Similarly, the cutout 59 has noses 67 and 68, and the cutout 60 has noses 69 and 70 similarly formed as above. At approximately the peripheral middle point from both cutouts 59 and 60 is disposed a tooth having a recess 71 for retaining the ball 16 and a rectangular recess 72 constructed on the outer circumferential periphery of the sleeve 14 for receiving a shaft fork (not shown) as shown in FIG. 4C. FIG. 4D shows a section taken along the line 4D—4D shown in FIG. 4A having the nose 61 at the inner side and rectangular recess 72 at the outer periphery.

Figure 5:
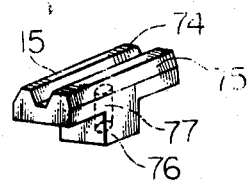
FIG. 5 is a perspective view of a key formed according to the present invention.
Figure 6:
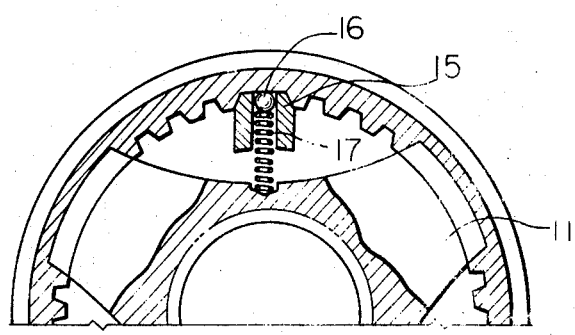
FIGS. 6 and 7 are sectional views of part of assembled synchronizer of this invention.
Figure 7:
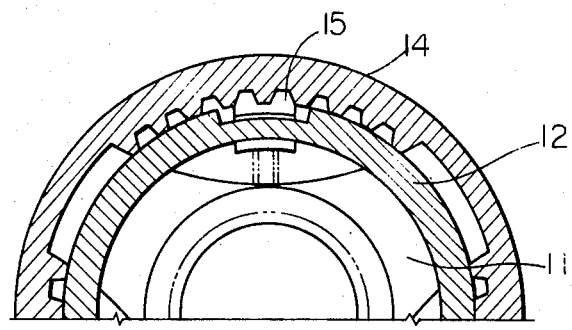

In FIG. 5, which shows the key 15 formed according to the present invention, which key formed with two teeth 74 and 75 meshed in spline with the teeth 56 of sleeve 14, as shown in FIGS. 6 and 7, a projection 76 in which a hole 77 is provided. As shown in FIGS. 1 and 6, the ball 16 and spring 17 are inserted into the hole 77. The width of the key 15 designated by $x$ in FIG. 5 is relatively smaller than that of the keyway 52 of the synchronizer ring 12 as denoted by X in FIG. 3A.

Returning back to FIG. 1, as to the arrangement of the parts of the synchronizer of the present invention, the sleeve retainer 11 is mounted in spline connection on the mainshaft 18, and adjacent to both sides of the sleeve retainer 11 are disposed the synchronizer rings 12 and 13. The sleeve 14 is disposed around the sleeve retainer 11 and synchronizer rings 12 and 13 so that the projections 31 of the sleeve retainer 11 are engaged in mesh with the recesses 58, 59 and 60 of the sleeve 14. The synchronizer rings 12 and 13 are engaged through the key 15 with the sleeve 14 so that the teeth 74 and 75 of the key 15 are engaged with the teeth 56 of the sleeve 14 while the key itself is engaged with the key way 51. The key 15 is so disposed as to stop the axial movement of the sleeve 14 so that the ball 16 disposed within the hole 77 of the key 15 is tensioned by the spring 17 so as to engage with the recess 71 (FIG. 4C) of the sleeve 14. Thus the sleeve retainer 11, sleeve and synchronizer rings 12 and 13 rotate integrally with each other in such a manner that since there is small difference in the width between the key way 51 of the synchronizer ring 12 and in that of the key 15 itself as previously described, there is some play or gap in the rotation of the synchronizer rings 12 and 13, and the sleeve 14. The synchronizer rings 12 and 13 are so disposed as to move slidably in an axial direction relative to the sleeve retainer 11, sleeve 14 and key 15, but are stopped at the position where they contact with the tapered surfaces 27 and 28 of the clutch drums of the spline gearwheels 23 and 24, respectively.

Figure 8:
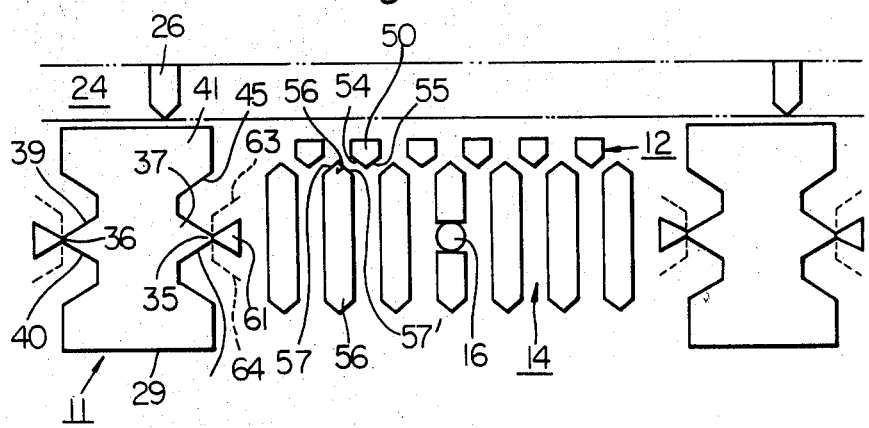
FIGS. 8 through 12 are views in section of a development of spline gearwheel, synchronizer ring and sleeve along with the pitch circle thereof in synchronizing operation in several steps of the synchronizer mechanism according to the present invention.

Referring now to FIGS. 8 through 12, which show the development of the sections of the teeth 26, 50 and 56 of the spline gearwheel 24, synchronizer ring 12 and sleeve 14, respectively along with the pitch circle thereof in operation, in neutral condition of the operation of the synchronizer 10 as shown in FIGS. 1 and 8, the sleeve 14 is disposed at the center of the sleeve retainer 11, so that the cone braking surface 49 of the synchronizer ring 12 is apart from the surface 28 of the clutch drum of the spline gearwheel 24. The synchronizer ring 13 is similar in the relation to the spline gearwheel 23 as described above.

In the neutral operation the sleeve 14, sleeve retainer 11 and synchronizer rings 12 and 13 are driven due to the inertia of the running vehicle by the wheels through a propeller shaft and the mainshaft 18 while the second and third gear ratio gearwheels 19 and 20 are released from the drive shaft of the vehicle engine to cause an idle operation. When the transmission is shifted from such condition as described above, the sleeve 14 is shifted to the right or left in FIG. 1 by means of a shifting mechanism (not shown) known per se. This operation of shifting to the right or left is the same, accordingly it will be explained hereinafter only that the sleeve 14 is shifted to the left in FIG. 1, which corresponds to the operation that the sleeve 14 be shifted upwardly in FIGS. 8 through 12.

When the sleeve 14 moves upwardly in FIG. 8 the key 15 the teeth 74 and 75 of which are engaged with the inner teeth 56 of the sleeve 14 and which is engaged with the sleeve 14 through the ball 16 so tensioned by the spring 17 as to engage with the recess 71 of the sleeve 14, simultaneously moves integrally with the sleeve 14 with the result that the projection 76 of the key 15 urges the synchronizer ring 12 upwardly in FIG. 8. Thus moving synchronizer ring 12 contacts with the surface 28 of the clutch drum of the spline gearwheel at the cone braking surface 49.

At the condition where the sleeve 14 is moved to either gear side of the second and third gear ratio gearwheels 19 and 20 there normally exists rotary speed difference therebetween with the result that when the sleeve 14 is moved upwardly in FIG. 8 a frictional driving force occurs from the second gear ratio gearwheel 20 to the synchronizer ring 12. Thus the synchronizer ring 12 is drawn by the second gear gearwheel 20 due to the contact between the surface 28 of the clutch drum of the spline gearwheel 24 integral with the gearwheel 20 and the cone braking surface 49 of the synchronizer ring 12. It follows that the synchronizer ring 12 rotates relative to the key 15 in the amount corresponding to the play provided between the key way 51 of the synchronizer ring 12 and the key 15 engaged therewith with the result that the teeth 50 provided on the periphery of the synchronizer ring 12 rotates relative to the sleeve 14 having the teeth 56 on the inside thereof to be engaged with the teeth 50 toward the rotating direction of the second gear gearwheel 20 as shown in FIG. 9, so that either of the tapered flanks 57 and 57' of the teeth 56 of the sleeve 14 approaches either of the tapered flanks 54 and 55 of the teeth 50 of the synchronizer ring 12.

It is assumed that the tapered flank 54 of the teeth 50 of the synchronizer ring 12 approaches the tapered flanks 57' of the teeth 56 of the sleeve 14. On the other hand, when the sleeve 14 is moved further upwardly in FIG. 9, the ball 16 disposed within the hole 77 of the key 15 and so tensioned by the spring 17 as to engage with the recess 71 of the sleeve 14, moves inwardly against the spring 17 with the result that the sleeve 14 may move upwardly in FIG. 9 beyond the ball 16. It means that the tapered flank 54 of the teeth 50 of the synchronizer ring 12 approaches further the tapered flank 57' of the teeth 56 of the sleeve 14, so that they contact each other. When they contact each other, the force that moves sleeve 14 is moved upwardly in FIG. 9 urges leftwardly in FIG. 9 the synchronizer ring 12 at the contact between the surface 28 of the clutch drum of the spline gearwheel 24 integral with the second gear ratio gearwheel 20 and the cone braking surface 49 of the synchronizer ring 12 so as to start a synchronizing action.

Figure 9:
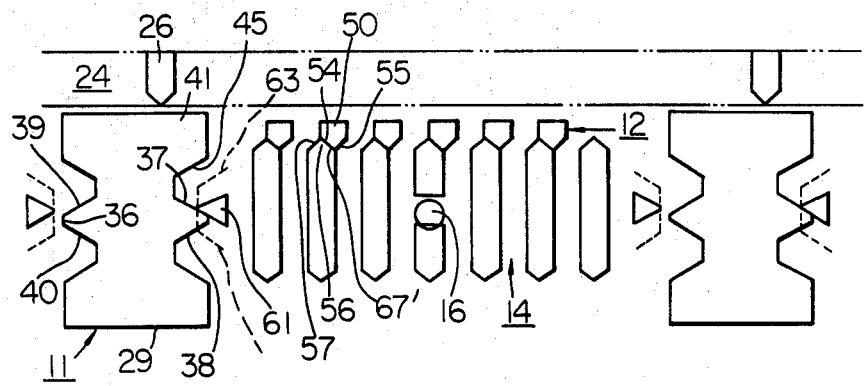

More particularly as to the synchronizing action in FIG. 9, when the sleeve 14 moves upwardly in FIG. 9 so that there is provided a some play with respect to the sleeve retainer 11, the frictional rotating force of the second gear ratio gearwheel 20 is transmitted to the synchronizer ring 12 through the contact between the surface 28 of the clutch drum of the spline gearwheel 24 integral with the second gear ratio gearwheel 20 and the cone braking surface 49 of the synchronizer ring 12 with the result that the sleeve 14 rotates integrally with the synchronizer ring 12 with respect to the sleeve retainer 11 in a small amount so that the tapered flank 64 of the sleeve 14 is contacted with the tapered flank 37 of the sleeve retainer 11.

Figure 13:
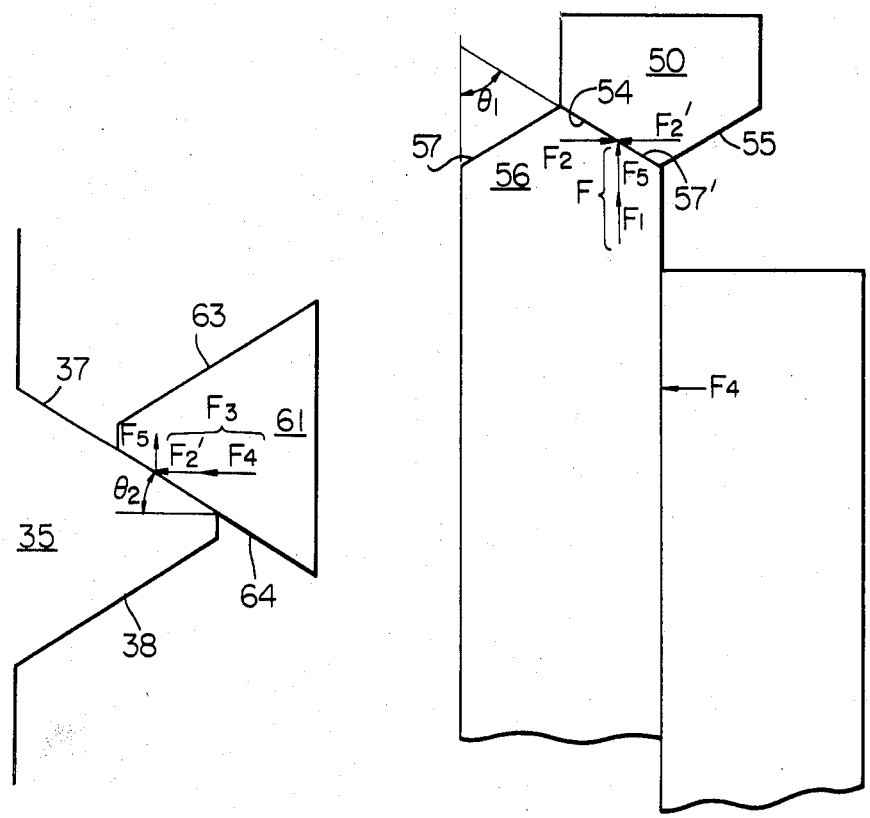
FIG. 13 is a view of vector relationships of the forces at the contact between the tapered flank of teeth of the synchronizer ring and the tapered flank of teeth of the sleeve, and the contact between the tapered flank of the sleeve and the tapered flank of the sleeve retainer for synchronizing operation of the synchronizer mechanism.

In FIG. 13, which shows the vector relationships of the forces at the contact between the tapered flank 54 of the teeth 50 of the synchronizer ring 12 and the tapered flank 57' of the teeth of the sleeve 14, and the contact between the tapered flank 64 of the sleeve 14 and the tapered flank 37 of the sleeve retainer 11, assuming that the force that the sleeve 14 urges the synchronizer ring 12 through the contact between the tapered flank 54 of the teeth 50 of the synchronizer ring 12 and the tapered flank 57' of the teeth of the sleeve 14 along the axial direction is designated by F, and the force that the sleeve 14 urges the synchronizer ring 12 at the contact between the surface 28 of the clutch drum of the spline gearwheel 24 and the cone braking surface 49 of the synchronizer ring 12 along the pitch circle of the sleeve 14 is denoted by F2, the force F2 acts against the frictional rotating force of the spline gearwheel 24 integral with the second gear gearwheel 20 at the inclined surface 54 of the teeth 50 of the synchronizer ring 12, and the amount of the force F2 is derived as the following formula with respect to the inclined angle $\theta_1$ of the surface 54 of the teeth 56 of the sleeve 14:

$$F2 = F \cot \theta_1$$

It is assumed that the frictional force caused by the force F applied to the sleeve 14 along the pitch circle of the teeth 56 of the sleeve 14 at the contact between the surface 28 of the clutch drum of the spline gearwheel 24 and the cone braking surface 49 of the synchronizer ring 12 is designated by F3. If the angle of the surface 28 of the clutch drum of the spline gearwheel 24 integral with the second gear ratio gearwheel 20 and that of the cone braking surface 49, and the inclined angle $\theta_1$ are predetermined in a manner that the force F3 is always larger than the force F2, in synchronizing operation of the synchronizer the sleeve 14 is prevented from urging the synchronizer ring 12 to move along the vector of the force F so as to rotate the synchronizer ring 12 with the result that the force F urges the synchronizer ring 12 through the contact between the tapered flank 54 of the teeth 50 of the synchronizer ring 12 and the tapered flank 57' of the teeth 56 of the sleeve 14 so as to promote the synchronizing action in such a state that the sleeve 14 urges the synchronizer ring 12 but cannot move upwardly in FIG. 9 the ring 12. The difference between the force F3 caused by the frictional force at the contact between the surface 28 of the clutch drum of the spline gearwheel 24 and the cone braking surface 49 of the synchronizer ring 12 along the pitch circle of the sleeve 14 and the force F2' caused by the reaction of the force F2 applied to the contact between the tapered flank 54 of the teeth 50 of the synchronizer ring 12 and that tapered flank 57' of the teeth 56 of the sleeve 14 is designated by F4, which acts to the teeth 56 of the sleeve 14 through the key 15. It follows that all the frictional rotating force caused by the rotation of the spline gearwheel 24 integral with the second gear ratio gearwheel 20 becomes the force for rotating the sleeve 14. Thus the sum of the forces F2' plus F4 acts on the contact between the tapered flank 64 of the sleeve 14 and the tapered flank 37 of the sleeve retainer 11 with the result that the component along the axial direction of the force F3 as the sum of the forces F2' and F4 designated by F5 acts in line with the force F in addition to cause the synchronizer ring 12 to move along the axial line. The amount of the force F5 is determined as follows depending upon the inclined angle $\theta_2$ of the contacting surface between the tapered flank 64 of the sleeve 14 and the tapered flank 37 of the sleeve retainer 11 from the pitch circle of the sleeve 14:

$$F5 = \tan \theta_2 \, (F2' + F4) = F3 \tan \theta_2$$

It is understood from the above description that the force F1 that the shifting mechanism moves the sleeve 14 is derived as follows:

$$F1 = F - F5$$

A synchronizing capacity M provided according to the present invention with the synchronizer caused by the frictional rotating force produced at the contact between the surface 28 of the clutch drum of the spline gearwheel 24 integral with the second gear ratio gearwheel 20 and the cone braking surface 49 of the synchronizer ring 12 by means of the force F applied to the sleeve 14 is as follows:

$$M = F \mu D / 2 \sin \beta \text{ sm,}$$

where $\mu$: a coefficient of friction at the contacting surfaces 28 and 49

D: means diameter of the contacting surfaces 28 and 49.

$\beta$: an angle of the contacting surfaces 28 and 49 from the axis

F: the force in the axial direction

The synchronizing action will finish when the speed of the second gear ratio gearwheel 20 becomes coincident to that of the synchronizer ring 12 due to the action of the frictional rotating force between the surface 28 of the clutch drum of the spline gearwheel 24 integral with the second gear ratio gearwheel 20 and the cone braking surface 49 of the synchronizer ring 12 or the synchronizing action thereof.

Figure 10:
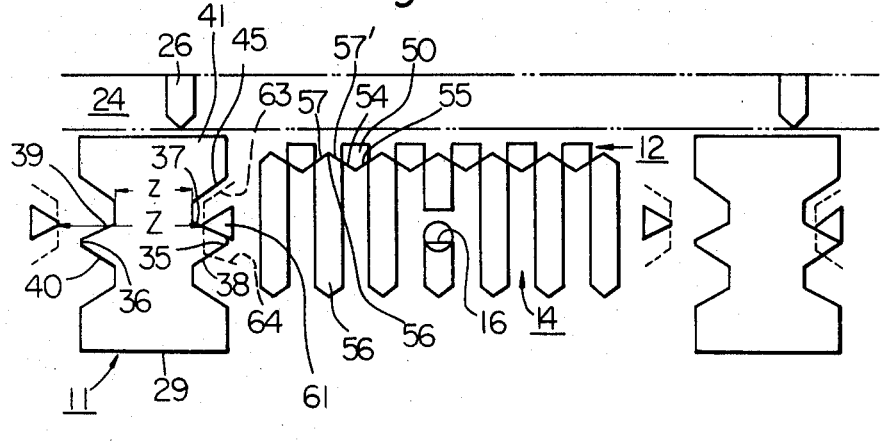

Upon completion of the synchronizing action of the synchronizer as previously described the frictional rotating force produced at the contact between the surface 28 of the clutch drum of the spline gearwheel 24 and the cone braking surface 49 of the synchronizer ring 12 will be reduced to zero so that the force F1 applied to the sleeve 14 moves the synchronizer ring 12 so that the teeth 56 of the sleeve 14 may be engaged in mesh with the teeth 50 of the synchronizer ring 12 similarly to the neutral state together with the sleeve 14 moving in the axial direction as shown in FIG. 10.

When the speed of the sleeve 14 is thus coincident with that of the second gear ratio gearwheel 20, the sleeve 14 is permitted to engage smoothly in mesh with the teeth 50 of the synchronizer ring 12, but since there exists a large difference between the width z (FIG. 10) of the narrowest portion along with the pitch circle of the sleeve retainer 11 at the projection 31 thereof and the distance Z (FIG. 10) between the noses 61 and 62 of the sleeve 14, which difference becomes a play between the sleeve 14 and teeth 50 of the synchronizer ring 12 when the driving power is transmitted therebetween which is not preferable for the transmission of the vehicle. In order to eliminate the aforementioned play between the width z of the narrowest portion along with the pitch circle of the sleeve retainer 11 at the projection thereof and the distance Z between the noses 61 and 62 of the sleeve 14, there are provided with the tapered flank 63 of the nose 61 of the sleeve 14 and the tapered flank 45 of the ear 41 at the projection 31 of the sleeve retainer 11 in such a manner that the teeth 56 of the sleeve 14 may be kept engaged in mesh with the teeth 50 of the synchronizer ring 12 during synchronizing action of the synchronizer as shown in FIG. 11.

Figure 11:
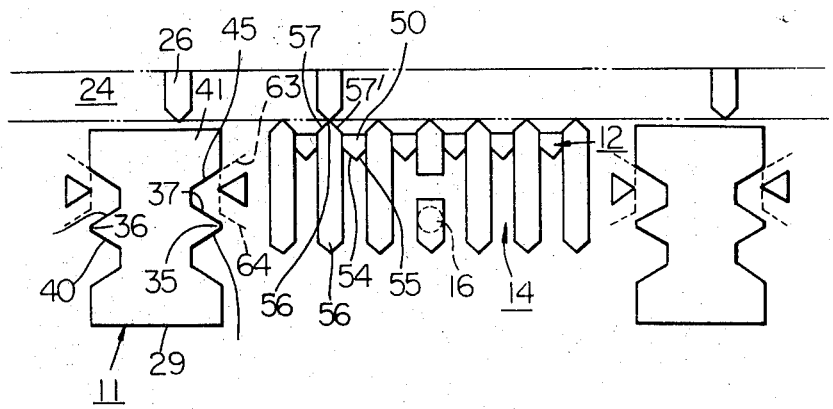
Figure 12:
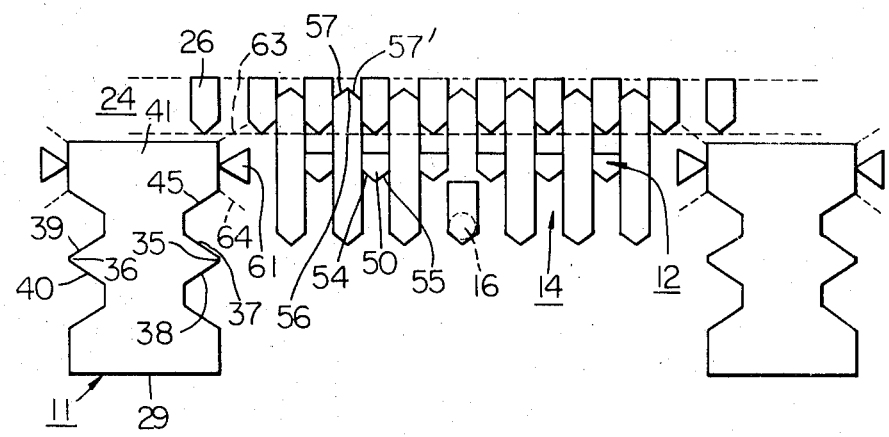

When the teeth 56 of the sleeve 14 move further upwardly in FIG. 11 to cause meshing engagement with the teeth 26 of the spline gearwheel 24, the synchronizing action if completed in such a manner as shown in FIG. 12.

It is understood from the foregoing description that the force F that the sleeve 14 urges the synchronizer ring 12 is the sum of the force F1 that the shifting mechanism urges on the sleeve 14 and the force F5 that is the component force along the axis parallel to the mainshaft 18 of the frictional driving force caused by the force F applied to the sleeve 14 along the pitch circle of the teeth 56 of the sleeve 14 at the contact between the surface 28 of the clutch drum of the spline gearwheel 24 and the cone braking surface 49 of the synchronizer ring 12 while in the conventional synchronizer mechanism the force that the sleeve urges the synchronizer ring is the same as that of the shifting mechanism pushing the sleeve. It means that the force F is larger than the force F1 with the result that if the pushing force of the synchronizer ring in the synchronizing mechanism of the present invention is the same as that in the conventional mechanism the force for pushing the sleeve 14 may be smaller than that in the conventional mechanism, or if the pushing force of the sleeve in the present mechanism is the same as that in the conventional mechanism the synchronizing capacity of the mechanism according to the present invention is increased in comparison with the conventional mechanism.

Figure 14A:
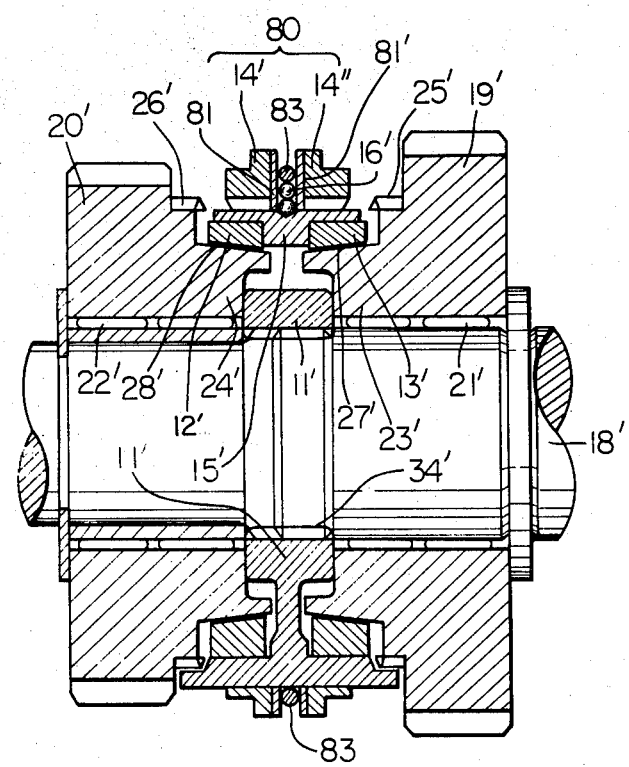
FIGS. 14A and 14B are sectional views of part of a conventional motor vehicle gearbox of the constant-mesh type similar to FIG. 1 but assembled with alternative components of the synchronizer mechanism according to the present invention.
Figure 14B:
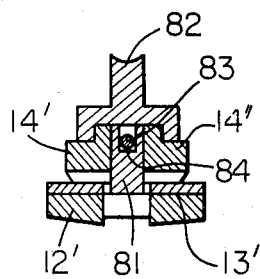

Referring now to FIGS. 14A and 14B, which show sectional views of part of a conventional motor vehicle gearbox of the constant-mesh type accommodated with a modification of the synchronizing mechanism according to the present invention, which mechanism 80 consists largely of a sleeve retainer 11', synchronizer rings 12' and 13', sleeves 14' and 14'', key 15', balls 16' and thrust plates 81 and 81'.

The synchronizing mechanism 80 is mounted on a mainshaft 18' similarly to the mechanism 10 of the first embodiment, on which second and third gear ratio gearwheels 19' and 20' are rotatably mounted on respective bearings 21' and 22' on the output shaft of the gearbox. The gearwheels 19' and 20' are provided with respective annular extensions 23' and 24' thereof formed with axially extending external splines or dog teeth 25' and 26', respectively, which extensions 23' and 24' are provided with axially tapered surfaces or clutch drums 27' and 28', respectively.

In FIG. 14B, which shows part of shifting mechanism according to present invention, a shifting lever 82 integrally engages sleeves 14' and 14'' at their tops with a spring ring 83 inserted within a recess 84 of a thrusting plate 81.

Figure 15A:
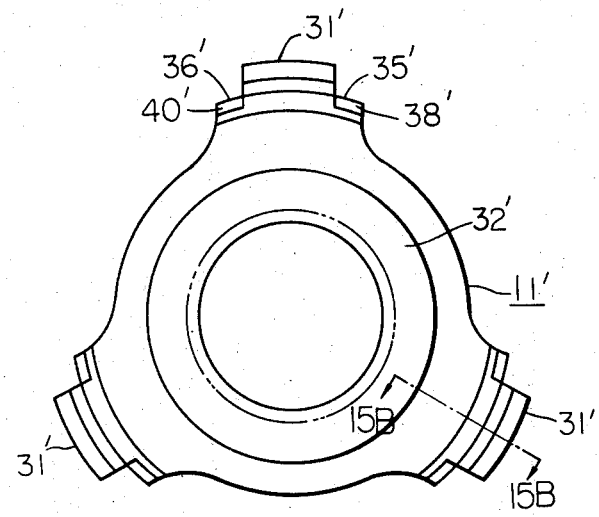
FIGS. 15A and 15B are views similar to FIGS. 2A and 2B but showing an alternative structure thereof.
Figure 15B:
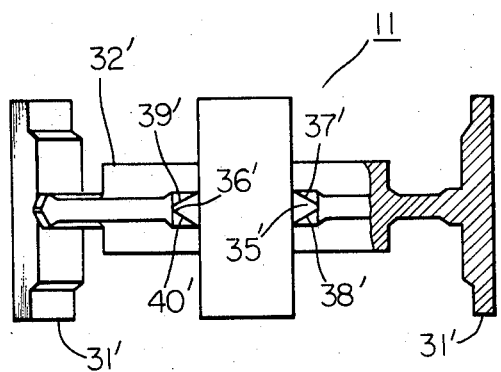

Referring now to FIGS. 15A and 15B, which show an alternate of sleeve retainer 11 of the present invention, which is provided with three projections 31' similar to those with numeral 31 shown in the first embodiment radially projecting from a splined boss 32' to be meshed with a spline 34' (FIG. 14A) provided on the mainshaft 18', and each projection 31' is provided steppedly with respect to the top at both circumferential sides of the projection 31 with two noses 35' and 36' projected circumferentially at its center having tapered or inclined surfaces or flanks 37', 38' and 39', 40', respectively.

In FIGS. 16A, 16B and 16C, which show a structure of modified synchronizer ring 12' or 13', which is provided with a cone braking surface 49' similar to the surface 28' of the clutch drum, a plurality of radial noses 50' integrally provided on the periphery thereof having tapered flanks 54' and 55' at one side, a plurality of ears 51' provided stepwise with respect to the nose 50', a plurality of another radial noses 85 integrally provided on the periphery thereof, a plurality of another ears 86 provided as shown in the drawings adjacent to the radial nose next to the nose 50' but on the same circumferential line  ears 51'.

FIG. 16B shows a development of part of the circumferential periphery of the synchronizer ring 12' shown by the line 16B–16B shown in FIG. 16A with the synchronizer ring 13' shown by broken lines disposed opposite to the ring 12', there is provided with a space 87 between the ears 51' and 86 of both the synchronizer ring 12' and 13' disposed adjacent both facing each other.

FIG. 16C shows a section of the nose 50' and ear 51' on the periphery of the synchronizer ring taken along the line 16C–16C in FIG. 16A. FIG. 16D is a sectional view of the radial noses 85 on the periphery of the synchronizer ring taken along the line 16D–16D in FIG. 16A. FIG. 16E is a view in section of the ear 86 of the synchronizer ring taken along the line 16E–16E in FIG. 16A. And, FIG. 16F shows a sectional view of the periphery of the synchronizer ring taken along the line 16F–16F shown in FIG. 16A.

Referring now to FIGS. 17A and 17B, which show the sleeves 14' and 14'' of alternative construction of the sleeve 14 of the first embodiment, each of which is provided with internal teeth 56' integrally mounted on the inner circumferential surface thereof for meshing in spline with the external dog teeth 25' and 26' of the annular axial extensions 23' and 24' of the gearwheels 19' and 20', and equidistant three cutouts 58', 59' and 60' provided on the inner surface of the sleeve 14' for meshing with the projections 31' of the sleeve retainer 11'.

FIG. 17B shows a sectional view of part on the periphery having the cutouts 58' of the sleeve 14' taken by the line 17B–17B seen in the direction designated by arrows 17B, which comprises the inner tooth 56' and cutout 58'.

In FIGS. 18A, 18B and 18C, which show alternative structures of the key 15' constructed according to the present invention, which key is provided with two wings 88 and 89 projected to both sides, cutout 90 provided between the wings 88 and 89 (FIGS. 18A and 18B), and with a projection 76', the width of the key 15' is designated by $x'$ in FIG. 18C. As best seen in FIG. 14A, the key 15' is so disposed as to be inserted into the space 87 provided between the ears 51' and 86 of both synchronizer rings 12' and 13' as shown in FIG. 16B so that the key 15' rotates integrally with both the synchronizer rings 12' and 13' as also seen in FIG. 14A. As shown in FIGS. 14A and 20, the balls 16' are inserted between the thrust plates 81 and 81' which will be described in detail hereinafter, and are radially inwardly urged by the resilient or spring ring 83 surrounding the balls 16'. The width of the key 15' designated by $x'$ in FIG. 18C is relatively smaller than that of the thrust plate 81 as denoted by $X'$ in FIG. 19A as will be described hereinafter.

In FIGS. 19A through 19F, which show the thrust plates 81 and 81' constructed according to the present invention, which plate 81 is provided with three cutouts 91 each for meshing with the projection of said sleeve retainer, with a pair of first projections 92 and 92' formed with tapered flanks 67' and 68', respectively corresponding to flanks 67 and 68 of the sleeve 14, at the side of cutouts 91 and also formed with tapered flanks 57''' corresponding to flank 57' of the sleeve 14 at the other side, with a pair of second projections 94 and 95 formed with tapered flanks 57'' corresponding to flank 57 of the sleeve 14 at the side of the cutouts 91, with a plurality of key ways 96 having the width $x'$ shown in FIG. 18C relatively wider than the width $X'$ thereof, with a plurality of holes 97 for holding the ball 16' and spring ring 83, and with a recess 98 for holding the spring ring 83 therearound.

Figure 19A:
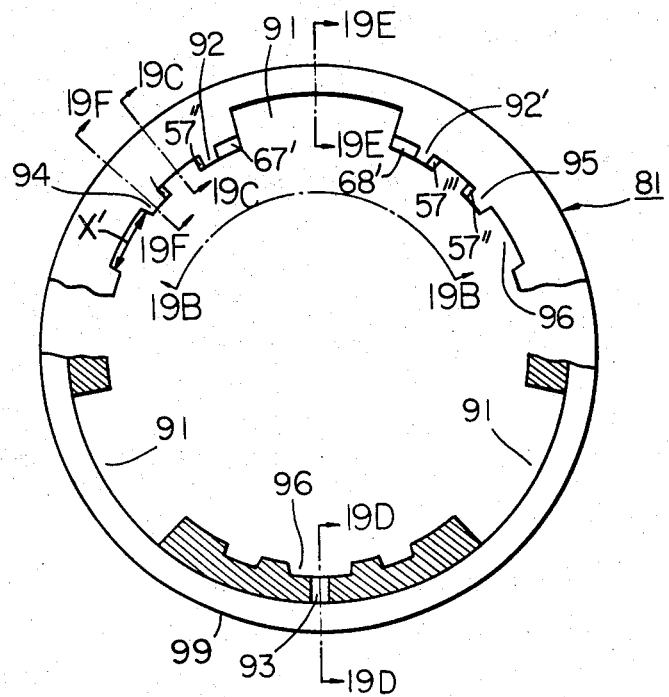
FIGS. 19A through 19F are views of a thrust plate constructed according to the present invention.
Figure 19B:
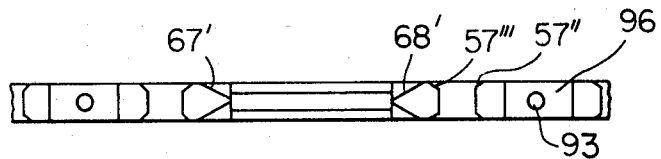
Figure 19C:
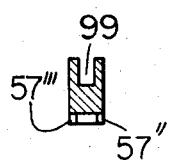
Figure 19D:
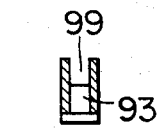
Figure 19E:
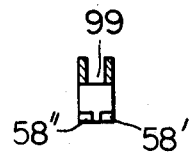
Figure 19F:

FIG. 19B shows the development of the inside surface of the thrust plate 81 as seen along the line 19B–19B in FIG. 19A. FIG. 19C shows a structure of a section taken along the line 19C–19C of the thrust plate 81 in FIG. 19A. FIG. 19D shows a structure of a section taken along the line 19D–19D of the thrust plate 81 in FIG. 19A. FIG. 19E shows a structure of a section taken along the line 19E–19E of the thrust plate 81 in FIG. 19A. And, FIG. 19F shows a structure of a section taken along the line 19F–19F of the thrust plate 81 in FIG. 19A.

In FIG. 20, there is shown an assembly of the sleeve retainer 11', synchronizer rings 12' and 13', sleeve 14', key 15', balls 16' and thrustplate 81'.

Figure 21A:
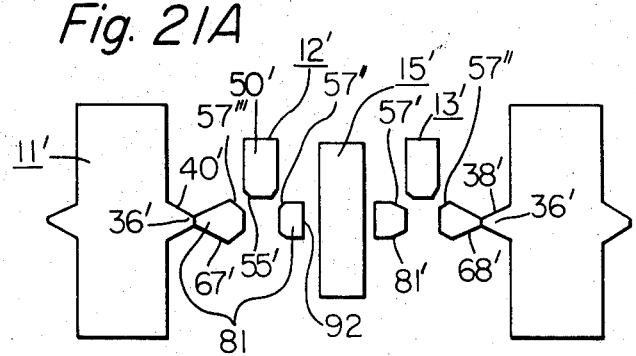
FIGS. 21A through 21D are views in section similar to FIGS. 8 through 12, but showing the synchronizing action of the second embodiment of the synchronizer according to the present invention.
Figure 21B:
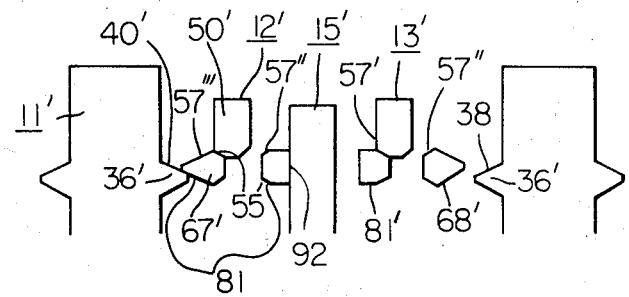
Figure 21C:
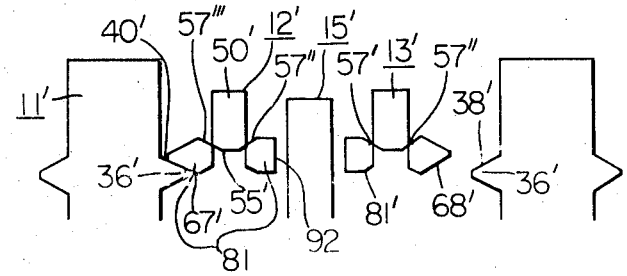
Figure 21D:
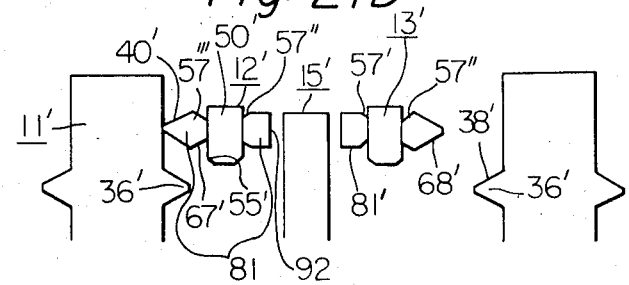

Referring now to FIGS. 21A through 21D, which show the development of the sections of arrangement of the sleeve retainer 11' provided with the nose 36' having the tapered flank 40', the inner projection having tapered flanks 57" and 67' of the thrust plate 81, the nose 50' having the tapered flank 55' of the synchronizer ring 12', and the key 15', respectively along with the pitch circle thereof in operation, the synchronizing operation of the arrangement is similar to that shown in FIGS. 8 through 13, but the force F5 effected in the arrangement of the first embodiment shown in FIG. 13 is performed by the contact between the tapered flank 40' of the noses 36' of the sleeve retainer 11' and the tapered flank 67' of the radially inner projection of the thrust plate 81. The synchronizing action is also effected by the contact between the tapered flank 57''' of the radially inward projections of the thrust plate 81 and the tapered flank 57'' of the radially outwardly projected noses 50' of the synchronizer ring 12'. FIG. 21A shows a neutral state of the arrangement of the components of the synchronizer in the second embodiment. FIG. 21B shows the synchronizing action similar in principle to the operation shown in FIGS. 9 and 13 of the arrangement of the synchronizer. FIG. 21C shows also the operation similar to that shown in FIG. 10 of the first embodiment of this arrangement. FIG. 21D shows the completion of the synchronizing operation of this second embodiment similar to that shown in FIG. 11 of the first embodiment.

Referring to FIG. 22, which is a view similar to the arrangement shown in FIGS. 1 and 14A with some components modified, a synchronizing mechanism 180 largely comprises a sleeve retainer 111, synchronizer rings 112 and 113, sleeves 114 and 114', gearwheels 119 and 120 and a ring 183. The arrangement of the synchronizer 180 is similar to that shown in FIG. 14A but instead of balls 16' and ring 83 there is provided single spring ring 183 disposed between the sleeves 114 and 114'.

In FIGS. 23A and 23B, which show another alternative sleeve retainer of the present invention, which retainer 111 is provided with three projections 131 constructed as shown in the drawings in a manner as to include two recesses 136 provided on both circumferential sides of the projections, which recess 136 has tapered flanks 137 and 138.

Figure 24A:
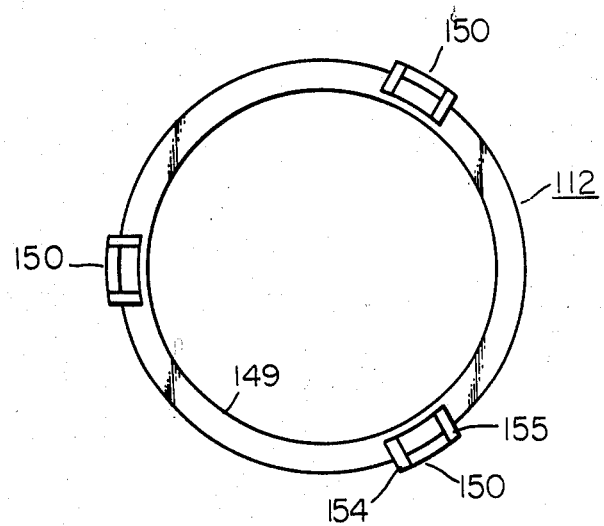
FIGS. 24A, 24B and 24C are views of another alternative synchronizer ring.
Figure 24C:
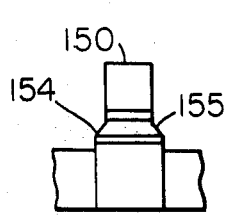
Figure 24B:
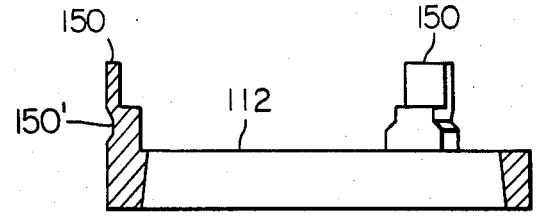

There is shown another alternative synchronizer ring 112 which is provided with a cone braking inner surface 149 formed with axially tapered surface for establishment of engagement snugly in contact with the tapered surface of the annular extension of said gearwheel, with three ears 150 projecting from the ring 112, which ear is formed with tapered flanks 154 and 155 at both sides thereof and with a recess 150' formed on the periphery of the ear for retaining the spring ring 183 in FIGS. 24A, 24B and 24C.

Figure 25A:
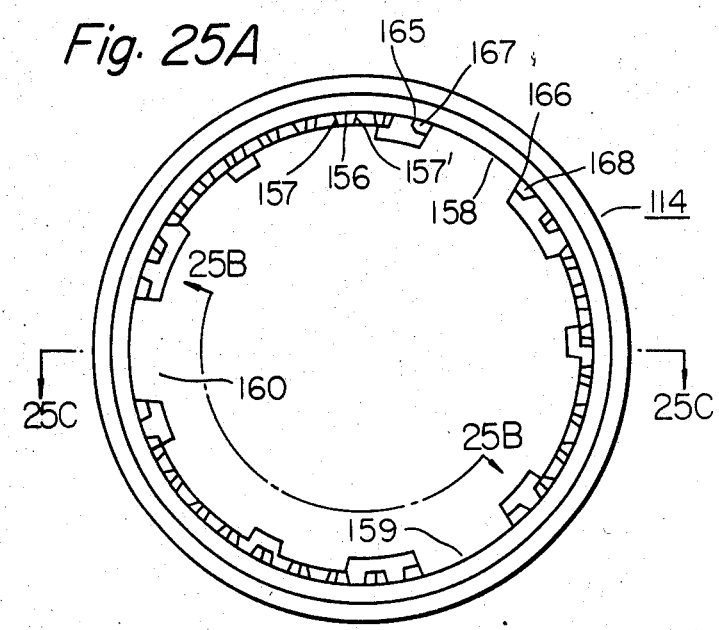
FIGS. 25A, 25B and 25C are views of another alternative sleeve.
Figure 25B:
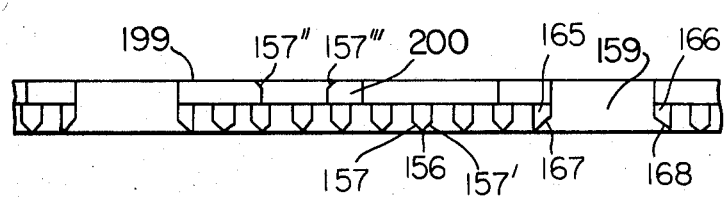
Figure 25C:
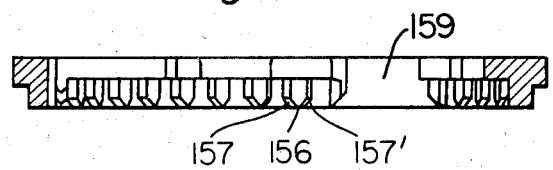

As shown in FIGS. 25A, 25B and 25C, there are provided with sleeves 114 and 114' (114' not shown) in the synchronizer 180 each of which is provided with three cutouts 158, 159 and 160 formed on the inner surface thereof, with a pair of projections 165 and 166 formed at both ends of each cutout having axially tapered flanks 167 and 168, respectively on the side of the cutout, with a plurality of internal teeth 156 formed on the inner surface thereof between the cutouts 158, 159 and 160 having tapered flanks 157 and 157' formed at each opposite side on both circumferential sides for meshing in spline with the external splines of the annular axial extension of the gearwheel, projections 199 disposed adjacent to the internal teeth 156 and having tapered flank 157'', and other projections 200 disposed adjacent to the internal teeth 156 and having tapered flank 157'''.

Figure 26A:
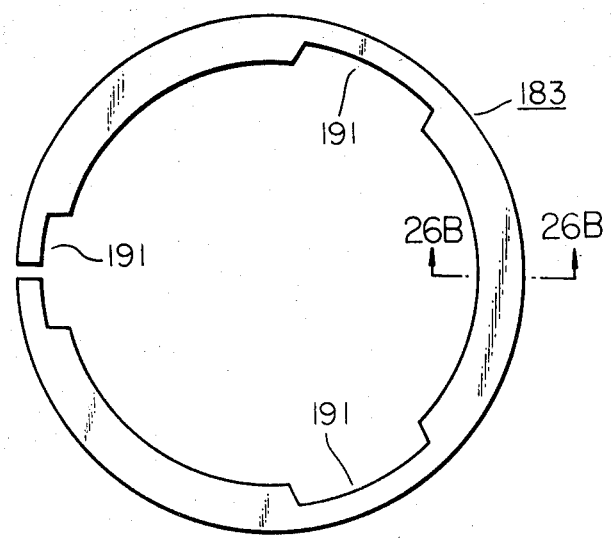
FIGS. 26A and 26B are views of a ring constructed according to the present invention.
Figure 26B:

Referring to FIGS. 26A and 26B, which show a structure of a ring 183, which is provided with three cutouts 191 on the inner surface of the ring.

Figure 27A:
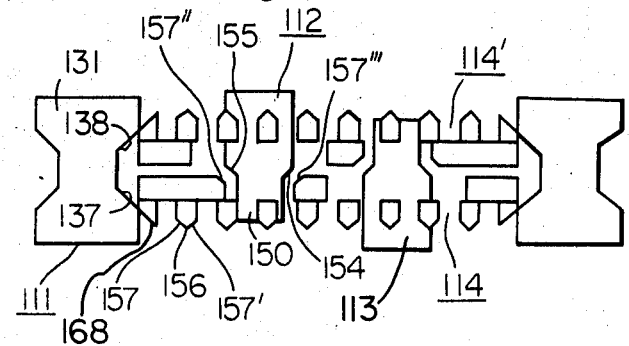
FIGS. 27A, 27B and 27C are views in section similar to FIGS. 8 through 12, but showing the synchronizing action of the third embodiment of the synchronizer according to the present invention.
Figure 27B:
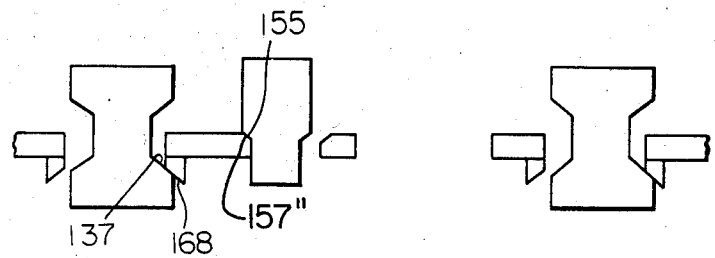
Figure 27C:
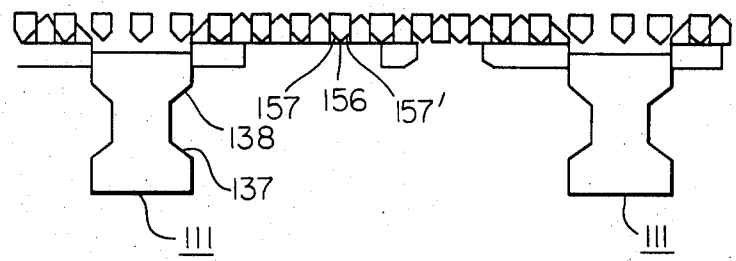

In FIGS. 27A, 27B and 27C, which show the development of the sections of an arrangement similar to that shown in FIGS. 21A through 21D according to the third embodiment of the synchronizer 180. The force F5 effected in the arrangement of the first embodiment shown in FIG. 13 is performed by the contact between the tapered flank 137 of the projection 131 of the sleeve retainer 111 and the tapered flank 168 of the sleeve 114, and in addition those of the sleeve retainer 111 and the sleeve 114'. The synchronizer action is also effected by the contact between the tapered flank 155 of the ears 150 of the synchronizer ring 112 and the tapered flank 157''' of the projection 199 of the sleeve 114 and additionally the contact between that of the other synchronizer ring 113 and that of the other sleeve 114', which doubles the synchronizing action in comparison with the aforementioned first and second embodiment of the synchronizer.

I claim:

1. A synchronizing mechanism of a transmission of constant-mesh type for an automotive vehicle comprising:

a rotary shaft driven by an engine and with axially extending splines formed thereon;

at least one gearwheel rotatably mounted on the rotary shaft adjacent to the splines thereof and having an annular axial extension formed with axially extending external splines thereon;

at least one spline gearwheel formed with an annular axial extension formed with an axially tapered surface thereon and with axially extending internal spline for meshing with the external splines of the extension of said gearwheel and with axially extending external spline for selectively connecting said gearwheel to the rotary shaft;

a sleeve retainer provided with a plurality of projections radially projecting from a splined boss of the retainer for meshing with the external splines formed on the shaft and with a plurality of holes each retaining a spring;

said projection each being formed with two noses provided centrally on both sides in the circumferential direction of the retainer, and formed with axially extending flanks and axially tapered flanks on both sides, said projection being further formed with four corner ears each being formed with an internally tapered portion in the circumferential direction;

at least one synchronizer ring having: a cone braking inner surface formed with an axially tapered surface for establishment of a slidable engagement with the tapered surface of the annular extension of said spline gearwheel; a plurality of axially extending external teeth formed on the outer periphery thereof and having axially tapered flanks on both sides thereof, and a plurality of key ways provided on the outer periphery thereof;

a sleeve provided with: axially extending internal splines which are formed on the inner surface thereof for meshing with the external splines of the splines of the spline gearwheel and synchronizer rings and which have axially tapered flanks on both sides at both ends; a plurality of cutouts formed on the inner surface thereof for meshing with said projections of the sleeve retainer, each of said cutouts having two noses formed at both ends thereof and projecting inwardly from both ends and having axially tapered flanks formed stepwise with respect to the noses to form the upper tapered flanks of the noses formed correspondingly to the tapered flanks of the noses of the sleeve retainer and the lower tapered flanks of the noses of the sleeve formed correspondingly to the tapered flanks of the ears of the sleeve retainer; and a circumferentially extending recess formed on the outer periphery thereof;

a key member formed on one side with two axially extending teeth and on the other with a projection having a hole for retaining a ball and spring extending between the hole and the hole of said sleeve retainer; and wherein an axial force is excercised by the contact between one of the tapered flanks of each of the noses of said sleeve retainer and one of the tapered flanks of each of the noses of said sleeve for a synchronizing action due to the contact between one of the tapered flanks of each of the internal splines of said sleeve and one of the tapered flanks of each of the external splines of said synchronizer ring.

2. A synchronizing mechanism according to claim 1, wherein said noses of the sleeve includes axially tapered flanks formed stepwise with respect to the noses, and one of said teeth includes a recess for retaining the ball and with a rectangular recess formed on the outer periphery of the sleeve along the circumferential line at the center.

3. A synchronizing mechanism of a transmission of constant-mesh type for an automotive vehicle comprising:

a rotary shaft driven by an engine and with axially extending splines formed thereon, in the region between the first and second gearwheels;

first and second gearwheels rotatably mounted on the rotary shaft in axially spaced relationship and each having an annular axial extension thereof formed with axially extending external splines thereon;

first and second spline gearwheels formed with an annular axial extension provided with an axially tapered surface thereon and with axially extending internal spline for meshing with the external spline of the extension of one of selected gearwheels and with axially extending external spline for selectively establishing a connection between said gearwheel and the rotary shaft, respectively;

a sleeve retainer provided with a plurality of projections radially projecting from the splined boss of the retainer for meshing with the external splines formed on the shaft and with a plurality of holes each for retaining a spring;

said projections each being formed with two noses provided centrally on both sides in the circumferential direction of the retainer, and formed with axially tapered flanks on both sides, said projections being further formed with four corner ears each being formed with an integrally tapered portion in the circumferential direction;

first and second synchronizer rings each having: a cone braking inner surface formed with an axially tapered surface for establishment of a slidable engagement with the tapered surface of the annular extension of one of the selected spline gearwheels; a plurality of axially extending external teeth formed on the outer periphery thereof and having axially tapered flanks on both sides thereof, and a plurality of key ways provided on the outer periphery thereof;

a sleeve provided with axially extending internal splines which are formed on the inner surface thereof for meshing in spline with the external splines of one of the selected spline gearwheels and synchronizer rings, and which have axially tapered flanks on both sides at both ends; a plurality of cutouts formed on the inner surface thereof for meshing with said projections of the sleeve retainer, each of which projections has two noses formed at both ends thereof and projecting inwardly from both ends has tapered flanks on both sides; and a circumferentially extending recess formed on the outer periphery thereof;

a key member formed on one side with two axially extending teeth and on the other with a projection having a hole for retaining a ball and spring extending between the hole and the hole of said sleeve retainer; and wherein an axial force is exercised by the contact between one of the tapered flanks of each of the noses of said sleeve and one of the tapered flanks of each of the noses of said sleeve for a synchronizing action due to the contact between one of the tapered flanks of each of the internal splines of said sleeve and one of the tapered flanks of each of the external splines of said synchronizer ring.

4. A synchronizing mechanism of a transmission of constant-mesh type for an automotive vehicle comprising:

a rotary shaft driven by an engine and with axially extending splines formed thereon;

first and second gearwheels rotatably mounted on the rotary shaft adjacent to the splines thereof and having an annular axial extension thereof formed with axially extending external splines thereon which extension has also an annular axial extension provided with an axially tapered surface thereon;

a sleeve retainer provided with a plurality of projections radially projecting from the splined boss of the retainer for meshing with the external splines formed on the shaft, each of said projection being provided stepwise with respect to the top at both circumferential sides thereof with two noses projected circumferentially at its center having tapered flanks;

first and second synchronizer rings each having: a cone braking inner surface formed with axially tapered surface for establishment of a slidable engagement with the tapered surface of the annular extension of said gearwheel; a plurality of first radial noses integrally provided on the periphery thereof and having tapered flanks on one side; a plurality of first ears provided stepwise with respect to the nose; a plurality of second radial noses integrally provided on the periphery thereof; and a plurality of second ears provided adjacent to the radial second noses next to the first noses on the same circumferential line as the first and second ears;

first and second sleeves each provided with: internal splines which is formed on the inner circumferential surface thereof for meshing with the external splines of the annular axial extension of the gearwheel, and a plurality of cutouts provided on the inner surface of the sleeves for meshing with said projections of said sleeve retainer;

a key member formed on one side with two wings projected to both sides, with a cutout provided between the wings, and with a projection, said key being so disposed as to be inserted into the space provided between the ears of both the first and second synchronizer rings so that the key rotates integrally with both the synchronizer rings; and a thrust plate provided with a plurality of cutouts each for meshing with the projection of said sleeve retainer, with a pair of first projections formed with tapered flanks, respectively at the side of the cutouts and also formed with tapered flanks on the other side, with a pair of second projections formed with tapered flanks on the side of the cutouts, with a plurality of key ways, with precesses for holding the spring ring therearound, and with a plurality of holes for retaining a ball wherein an axial force is exercised by the contact between one of the tapered flanks of each of the noses of said sleeve retainer and one of the tapered flanks of each of the noses of said sleeve for a synchronizing action due to the contact between the tapered flanks of the radially inward projections of the thrust plate and the tapered flanks of the radially outwardly projected noses of one of the selected synchronizer rings.

5. A synchronizing mechanism of a transmission of constant-mesh type for an automotive vehicle comprising:

a rotary shaft driven by an engine and with axially extending splines formed thereon;

first and second gearwheels rotatably mounted on the rotary shaft in axially spaced relationship and each having an annular axial extension thereof formed with axially extending external splines thereon which extension has also an annular axial extension provided with an axially tapered surface thereon;

a sleeve retainer provided with a plurality of projections radially projecting from the splined boss of the retainer for meshing with the external splines formed on the shaft;

each of said projection being provided stepwise with respect to the top centrally on both sides in the circumferential direction of the retainer, formed with two noses projected circumferentially on both sides and having tapered flanks formed inside;

first and second synchronizer rings each having: a cone braking inner surface formed with axially tapered surface for establishment of a slidable engagement with the tapered surface of the annular extension of said gearwheel; a plurality of first radial noses integrally provided on the periphery thereof and having tapered flanks on one side, a plurality of first ears provided stepwise with respect to the nose, a plurality of second radial noses integrally provided on the periphery thereof, and a plurality of second ears provided adjacent to the radial second noses next to the first noses on the same circumferential line as the first and second ears;

first and second sleeves each provided with: internal splines which are integrally mounted on the inner circumferential surface thereof for meshing with the external splines of the annular axial extension of one of the selected gearwheels, and a plurality of cutouts provided on the inner surface of the sleeve for meshing with the projections of said sleeve retainer with a plurality of ear projections from said ring, said ear being formed with tapered flanks at both sides thereof and with a recess formed on the periphery of the ear for retaining the spring ring;

a spring ring disposed between said sleeves and formed with a plurality of cutouts for meshing with the projections of said sleeve retainer; and wherein an axial force is excercised by the contact between one of the tapered flanks of each of the noses of said sleeve and one of tapered flanks of the teeth of said synchronizer for a synchronizing action due to the contact between the tapered flanks of the radially inward projections of the thrust plate and the tapered flanks of each of the radially outwardly projected noses of one of the selected synchronizer rings.